United States Patent
Faragher

(10) Patent No.: US 9,615,049 B2
(45) Date of Patent: *Apr. 4, 2017

(54) VIDEO MULTIVIEWER SYSTEM PROVIDING DIRECT VIDEO DATA TRANSFER TO GRAPHICS PROCESSING UNIT (GPU) MEMORY AND RELATED METHODS

(75) Inventor: Chad Faragher, Kitchener (CA)

(73) Assignee: Imagine Communications Corp., Englewood, CO (US)

(*) Notice: Subject to any disclaimer, the term of this patent is extended or adjusted under 35 U.S.C. 154(b) by 1190 days.

This patent is subject to a terminal disclaimer.

(21) Appl. No.: 12/100,510

(22) Filed: Apr. 10, 2008

(65) Prior Publication Data

US 2009/0259775 A1 Oct. 15, 2009

(51) Int. Cl.
| | |
|---|---|
| *G06F 13/28* | (2006.01) |
| *H04N 5/445* | (2011.01) |
| *H04N 21/426* | (2011.01) |
| *H04N 21/431* | (2011.01) |
| *H04N 21/4402* | (2011.01) |
| *H04N 21/443* | (2011.01) |
| *H04N 21/81* | (2011.01) |

(52) U.S. Cl.
CPC ..... *H04N 5/44591* (2013.01); *H04N 5/44504* (2013.01); *H04N 21/42653* (2013.01); *H04N 21/4316* (2013.01); *H04N 21/4435* (2013.01); *H04N 21/440263* (2013.01); *H04N 21/4438* (2013.01); *H04N 21/8146* (2013.01)

(58) Field of Classification Search
USPC .................................................. 345/530–574
See application file for complete search history.

(56) References Cited

U.S. PATENT DOCUMENTS

| | | | |
|---|---|---|---|
| 5,293,491 A * | 3/1994 | Leung et al. | 710/28 |
| 5,600,573 A | 2/1997 | Hendricks et al. | 364/514 R |
| 5,867,657 A | 2/1999 | Bolosky et al. | 395/200.49 |
| 5,928,327 A | 7/1999 | Wang et al. | 709/217 |
| 5,986,633 A | 11/1999 | Takeuchi | 345/115 |
| 6,057,888 A | 5/2000 | Bril | 348/553 |
| 6,170,047 B1 | 1/2001 | Dye | 711/170 |
| 6,243,095 B1 | 6/2001 | Shile et al. | 345/357 |
| 6,317,165 B1 * | 11/2001 | Balram et al. | 348/699 |
| 6,393,163 B1 | 5/2002 | Burt et al. | 382/294 |
| 6,571,349 B1 | 5/2003 | Mann et al. | 714/6 |
| 6,763,176 B1 * | 7/2004 | Trottier et al. | 386/280 |

(Continued)

OTHER PUBLICATIONS

Evertz-MVP®—Expect the Best, Accept No Substitutes!, available at http://www.evertz.com/products/MVP.

(Continued)

*Primary Examiner* — Yingchun He
(74) *Attorney, Agent, or Firm* — Tarolli, Sundheim, Covell & Tummino LLP

(57) ABSTRACT

A video multiviewer system may include a video input/output (I/O) controller, a system memory, and a graphics processing unit (GPU) comprising a GPU memory. The system may further include a central processing unit (CPU) for operating the video I/O controller to transfer video data to the GPU memory via direct memory access (DMA) without being stored in the system memory, and a display for displaying multiple video windows based upon video data in the GPU memory.

14 Claims, 8 Drawing Sheets

(56) References Cited

U.S. PATENT DOCUMENTS

| | | | |
|---|---|---|---|
| 6,816,194 B2 | 11/2004 | Zhang et al. | 348/240.27 |
| 7,023,488 B2 | 4/2006 | Szybiak et al. | 348/484 |
| 7,092,621 B1 | 8/2006 | Yoshino et al. | 386/125 |
| 7,205,997 B1 | 4/2007 | Williams et al. | 345/582 |
| 7,333,114 B2 | 2/2008 | Andrews et al. | 345/557 |
| 2002/0044161 A1 | 4/2002 | Sugai | 348/781 |
| 2003/0231259 A1 | 12/2003 | Yui et al. | 348/564 |
| 2004/0212679 A1* | 10/2004 | Jun | G08B 13/19693 348/159 |
| 2005/0254440 A1 | 11/2005 | Sorrell | 370/264 |
| 2006/0098022 A1 | 5/2006 | Andrews et al. | 345/557 |
| 2007/0050336 A1 | 3/2007 | Bugir et al. | 707/3 |
| 2007/0050366 A1 | 3/2007 | Bugir et al. | 707/9 |
| 2007/0050382 A1 | 3/2007 | Bugir et al. | 707/100 |
| 2007/0103590 A1* | 5/2007 | Azar et al. | 348/459 |
| 2009/0079694 A1* | 3/2009 | Day et al. | 345/163 |

OTHER PUBLICATIONS

Evertz-MVP®, 7767VIP4-HSN & 7767VIP4-SN VIP™ Four Input Video Monitoring and Display, available at http://www-evertz.com/products/7767VIP4.

OmniTek, Advance Measurement Technology, XR Extreme Resolution Waveform Monitor and Image Analyzer for Post-Production, 2007, available at www.omnitek.tv.

OmniTek, Advance Measurement Technology, TQ Complete Video and Audio Monitoring for Broadcast and Transmission Quality Control, 2007, available at www.omnitek.tv.

Avitech International Corporation, MCC-8004 Media Command Center, 2008, available at www.avitechvideo.com/media_Command8000.asp.

Avitech International Corporation, VCC-8000 Media Command Center, 2008, available at www.avitechvideo.com/media_Command8000.asp.

* cited by examiner

VIDEO MULTIVIEWER SYSTEM PROVIDING DIRECT VIDEO DATA TRANSFER TO GRAPHICS PROCESSING UNIT (GPU) MEMORY AND RELATED METHODS

FIELD OF THE INVENTION

The present invention relates to the field of video processing systems, and, more particularly, to video multiviewers and related methods.

BACKGROUND OF THE INVENTION

Multiviewers are video platforms that can be used for a wide range of video and broadcast applications. With the increasing shift to digital video formats, multiviewers are becoming a tool of ever-increasing importance for video engineers and technicians. Multiviewers provide users with the ability to view real-time multiple images in various pre-configured displays.

One exemplary multiviewer system is the DX series Multiviewers from the present assignee Harris Corp. The DX series Multiviewers deliver modular configurations for 4, 8, 12 or 16 SDI or composite inputs, with auto detect of NTSC, PAL or SDI formats. Composite, component, SDI and line doubled VGA outputs provide customers with a wide range of flexible display options. Front panel controls and remote control via RS-232/422 provide the user with the ability to view real-time multiple images in various pre-configured displays. Optional software allows the user configuration of displays, and multi-system control, while options also exist for in-picture audio monitoring of SDI embedded audio. Standard alarm features include loss of video sync, black picture & frozen picture detection.

Another exemplary multiviewer system is the 7767VIP4 signal monitoring module from the Evertz Corporation of Burlington, Ontario, Canada. The module simultaneously accepts, auto-detects, analyzes and displays four synchronous or asynchronous HD/SD/analog video signals. An additional fifth computer graphic input may be used for display of a dynamic background image.

Despite the advantages of such multiviewer systems, further enhancements may be desirable in some applications. For example, system memory constraints often impose restrictions on the number of video inputs that may be simultaneously displayed. Additionally, the ability of such systems to display added graphic content (e.g., backgrounds, indicators, etc.) along with the video inputs on the display may be encumbered by the requirement for separate inputs for such content, or for performing offline modifications to video inputs or display templates, for example.

SUMMARY OF THE INVENTION

In view of the foregoing background, it is therefore an object of the present invention to provide a system and related methods for providing enhanced multiviewer video input viewing capabilities.

This and other objects, features, and advantages are provided by a video multiviewer system which may include a video input/output (I/O) controller, a system memory, and a graphics processing unit (GPU) comprising a GPU memory. The system may further include a central processing unit (CPU) for operating the video I/O controller to transfer video data to the GPU memory via direct memory access (DMA) without being stored in the system memory, and a display for displaying multiple video windows based upon video data in the GPU memory. Accordingly, the system may advantageously increase the amount of video data transferred to the GPU within a given amount of time, and thereby allow more video inputs to be displayed on the display than would otherwise be possible if the same video had to be routed through the system memory.

More particularly, the video I/O controller may assign addresses to be used for video data in the GPU memory, and the CPU may cooperate with the video I/O controller to lock the assigned addresses. By way of example, the GPU memory may include at least one texture buffer in which the CPU locks the assigned addresses. Furthermore, the video I/O controller may receive a plurality of video input streams, and the at least one texture buffer may include a respective texture buffer for each video input stream. Moreover, the CPU may operate the GPU to transfer video data in real time. Also, the video multiviewer system may further include at least one data communications bus coupled to the video I/O controller, the system memory, the GPU, and the CPU.

By way of example, the video data may include video frame data. Furthermore, the CPU may use at least one Microsoft DirectX application programming interface (API) for operating the GPU, for example.

A related method for displaying multiple video windows on a display may include operating a central processing unit (CPU) to operate a video I/O controller to transfer video data to a GPU memory via DMA without being stored in a system memory. The method may further include displaying multiple video windows on the display based upon video data in the GPU memory.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
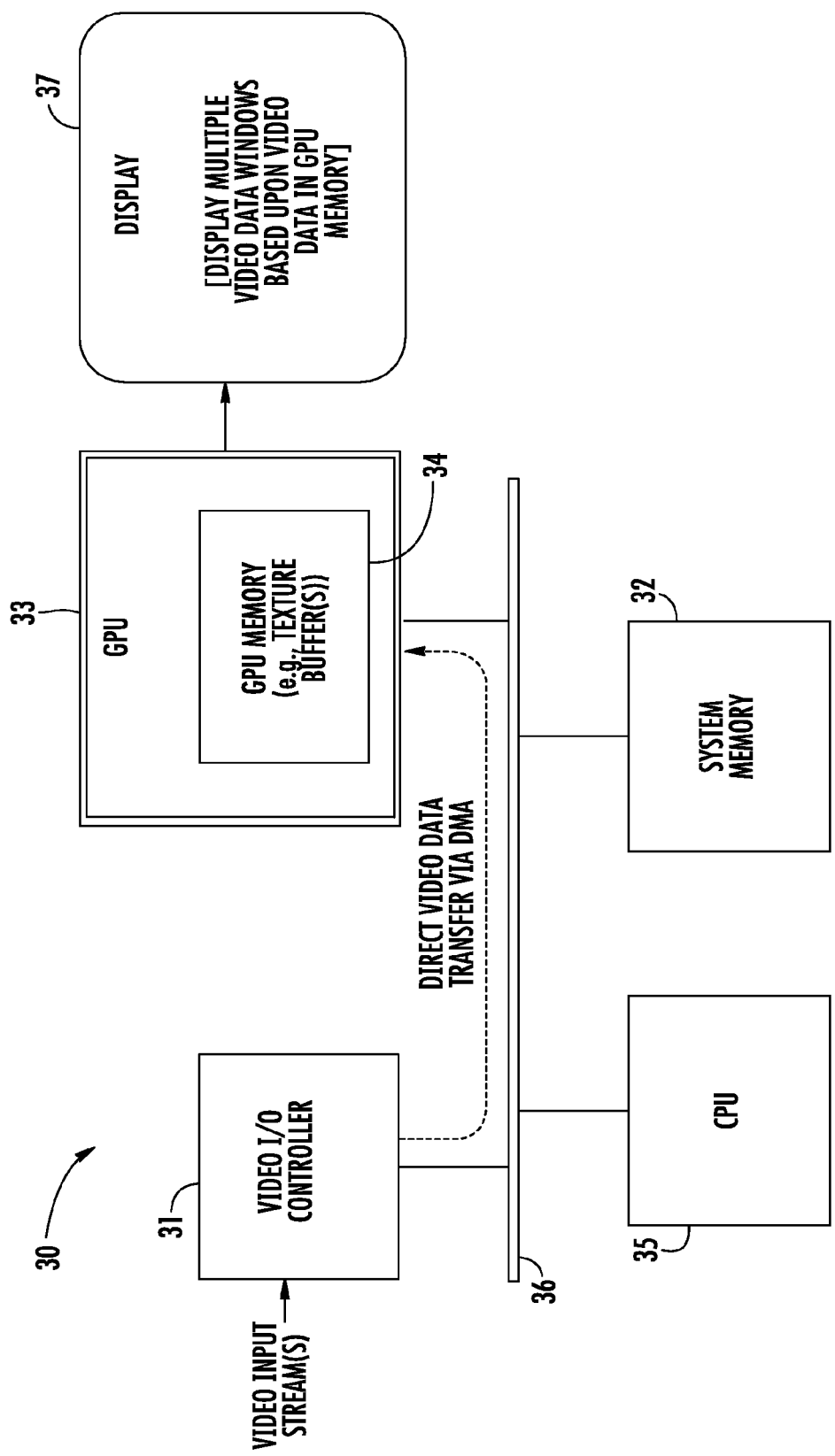
FIG. 1 is a schematic block diagram of a video multiviewer system providing direct video data transfer to a GPU memory in accordance with the invention.
Figure 2:
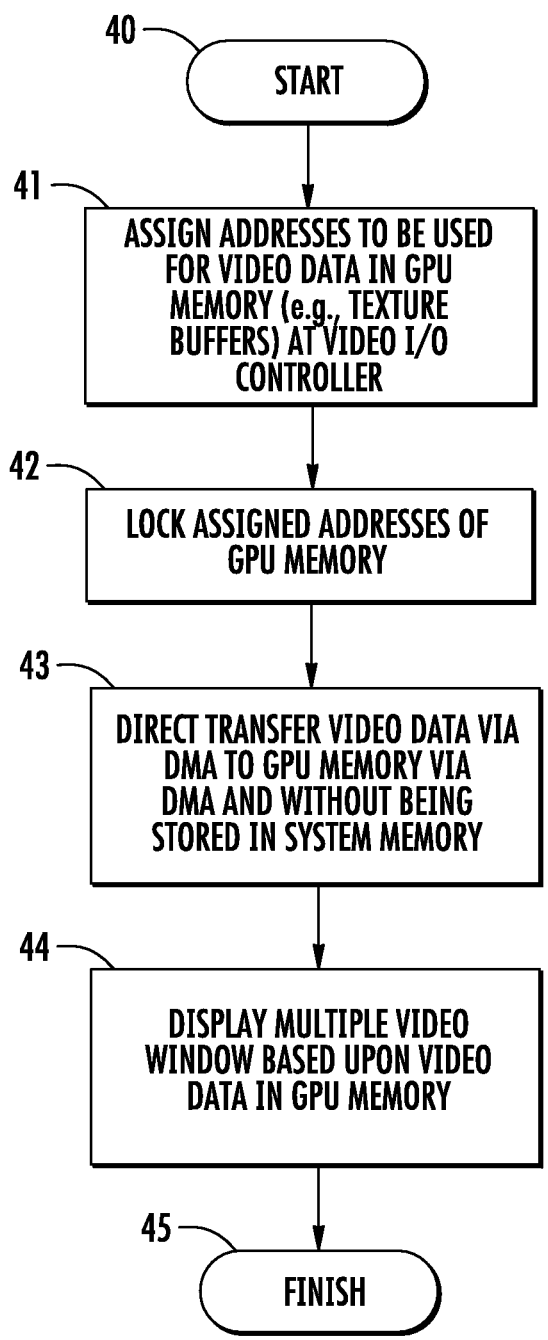
FIG. 2 is a flow diagram illustrating method aspects corresponding to the system of FIG. 1.

Referring initially to FIGS. 1 and 2, a video multiviewer system 30 and associated method steps are first described. By way of background, transferring video streams to the graphics memory of a display typically requires the use of an intermediate system memory buffer to manage the transfer between the hardware device and the display. This consumes host CPU resources, memory resources, and bus bandwidth, thus placing a significant limit on the number of video streams than can be simultaneously displayed with such a typical prior art architecture.

One technology that is currently used for video rendering is Microsoft DirectShow, part of the DirectX family of API applications. DirectShow allows the transfer of video streams to video memory, but it requires CPU memory resources to manage the transfers. Typical prior art techniques use an input/output (I/O) controller to copy video stream data to system memory from the hardware device, and then the CPU copies the video stream data to the display device. Unfortunately, this requires two separate DMA transfer operations. For relatively high bandwidth video streams, this may pose a significant limiting factor in a video system's capabilities, since DMA bandwidth has a fixed limit.

The system 30 illustratively includes a video I/O controller 31, a system memory 32, and a graphics processing unit (GPU) 33 including a GPU memory 34. By way of example, the GPU memory 34 may include one or more texture buffers which may be associated with respective video input streams or feeds, as will be appreciated by those skilled in the art. The system 30 also illustratively includes a central processing unit (CPU) 35. In the illustrated example, access between the video I/O controller 31, GPU 33, CPU 35, and system memory 32 is provided via a system data communications bus 36, as will also be appreciated by those skilled in the art.

Beginning at Block 40, the video I/O controller 31 assigns addresses to be used for video data in the GPU memory 33 (i.e., texture buffers), at Block 41. By way of comparison, using the DirectShow application discussed above, in a typical prior art arrangement the texture buffers would temporarily be locked while textures are loaded from the video I/O controller to the texture buffers via the system memory. Drawing or rendering operations would not be permitted during such locked periods. Yet, the constant locking and unlocking of the texture buffers requires additional overhead, and therefore delays memory transfers. Moreover, this can also result in a video I/O controller changing destination addresses in the GPU memory, which may result in a still further overhead penalty, particularly if the video I/O controller has to be reset or re-programmed to desired texture buffer addresses.

In accordance with the present example, the CPU 35 advantageously operates the video I/O controller 31 to transfer video data to the GPU memory 34 via direct memory access (DMA) without being stored in the system memory 32 by cooperating with the video I/O controller to permanently (or semi-permanently) lock the assigned addresses, at Blocks 42-43. By locking the texture buffer addresses for a Direct3D texture, for example, the physical memory address may be used to allow the video I/O controller 31 to DMA transfer video stream data from video inputs directly to respective texture buffers, as will be appreciated by those skilled in the art.

The above-described technique advantageously does not require the intermediate system memory 32 to be used as a host memory buffer for the video stream data, thus saving this memory for other uses and expediting the transfer of the video data to the texture buffers. That is, a device driver of the GPU 33 may advantageously not change the physical memory address of the texture buffer, so that it therefore remains available for drawing, rendering, etc., for the duration of the transfer. Considered alternatively, since frames of video data only need to be passed via DMA transfer once to the GPU memory 34 (i.e., texture buffers), instead of twice (i.e., also to the system memory 32), it effectively doubles the number of video streams that could otherwise be transferred with the same system resources.

Figure 7:
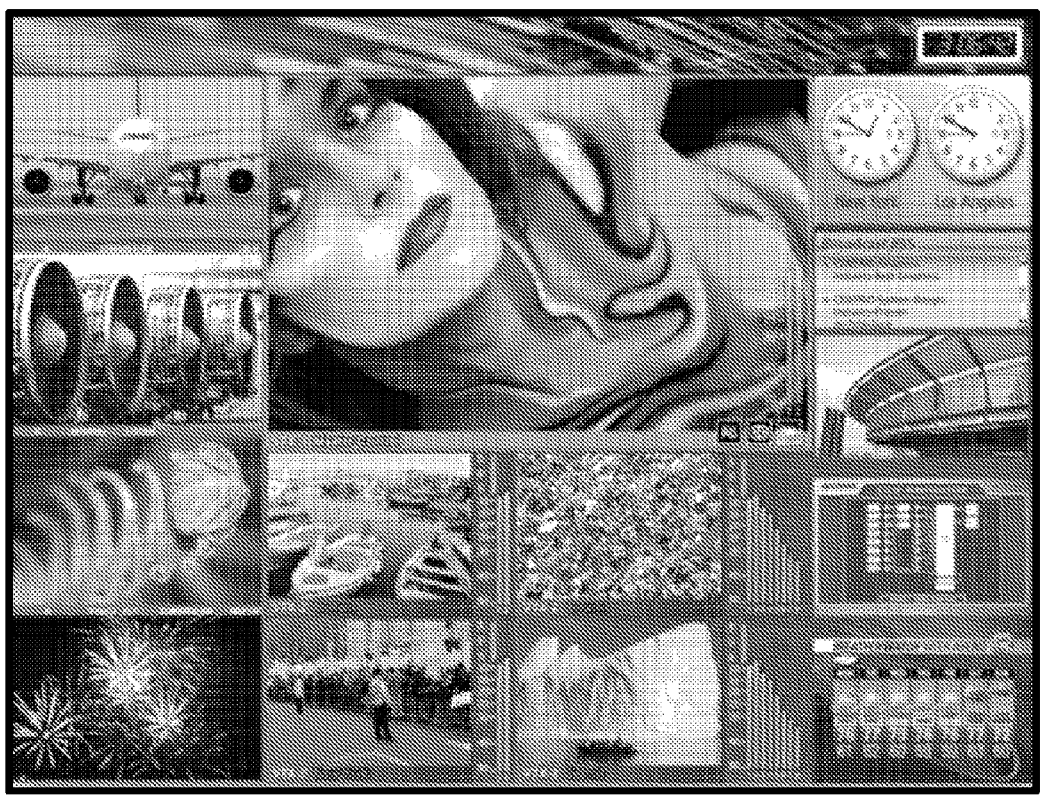

As such, multiple video windows (i.e., more video stream windows than would be otherwise possible on a comparable prior art system using an indirect transfer of video frame data through a system memory) may therefore be displayed on a display 37 based upon the video data in the GPU memory 34 (see FIGS. 7-9), at Block 44, thus concluding the method illustrated in FIG. 2 (Block 45). The CPU 35 is therefore advantageously able to operate the video I/O controller 31 and the GPU 33 to transfer video data in real time, as will be appreciated by those skilled in the art. Again, the foregoing technique may be implemented using one or more of the above-noted Microsoft DirectX APIs (e.g., DirectShow, etc.) for operating the GPU 33, although other suitable technologies may also be used, as will be appreciated by those skilled in the art.

One particular advantage of the above-described configuration is that it allows the CPU and/or GPU to render added graphic content or "extra adornments" to graphics displays. By way of background, typical prior art multiviewers are generally not considered graphically rich, and are usually limited to displaying video picture-in-picture (PIP) displays, borders, simple text with limited fonts, VU meters, etc. That is, typical multiviewers are largely hardware-based solutions that restrict the flexibility of the graphics output of the system. GPU-based graphics software products may deliver desired flexibility in output (i.e., added graphics content), but they generally lack the ability to display multiple real-time video streams.

Figure 3:
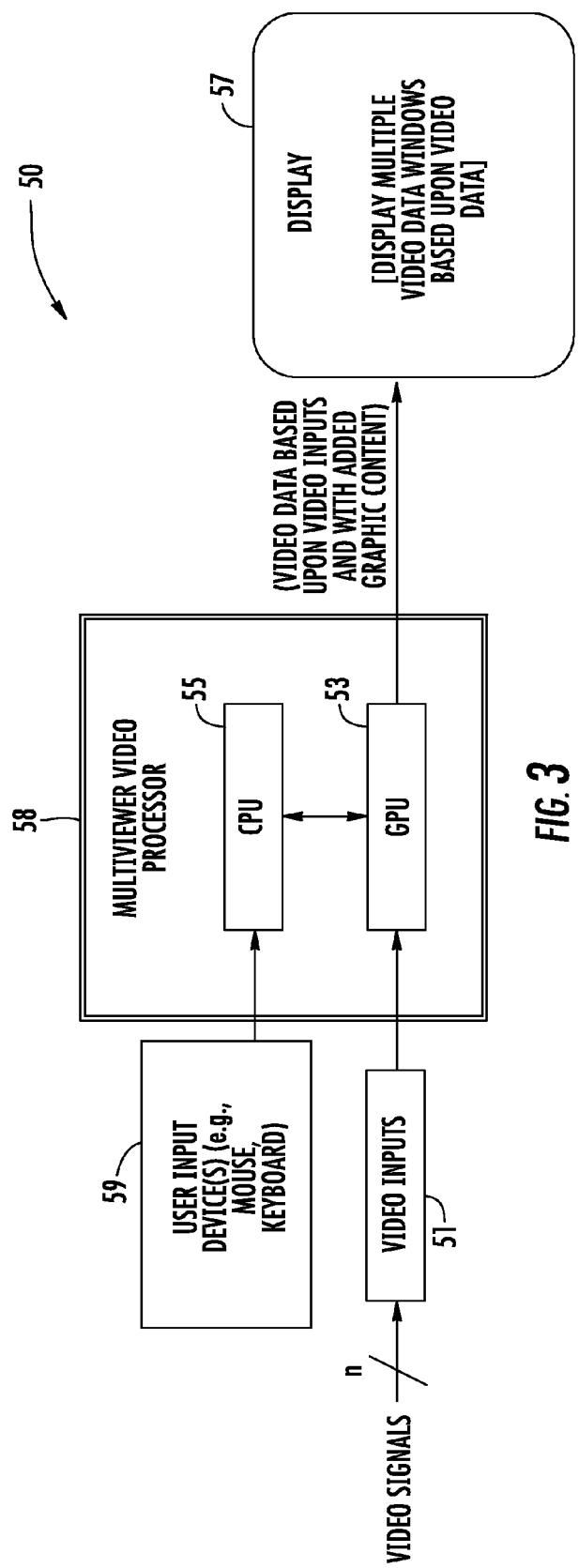
FIG. 3 is a schematic block diagram of another video multiviewer system providing video data based upon video inputs and with added graphic content.
Figure 4:
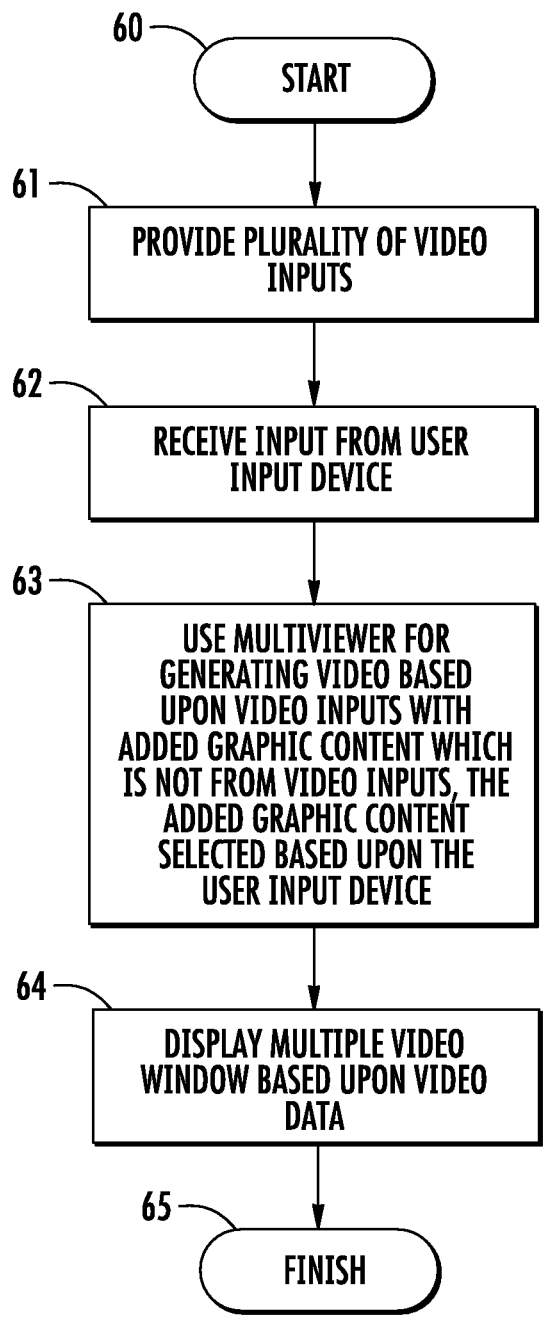
FIG. 4 is a flow diagram illustrating method aspects corresponding to the system of FIG. 3.

Turning now to FIGS. 3 and 4, a video multiviewer system 50 and associated method are now described. The system 50 illustratively includes a plurality of n video inputs 51 receiving respective video feeds or streams (Blocks 60, 61), and a multiviewer video processor 58 coupled to the inputs. More particularly, the multiviewer video processor 58 illustratively includes a CPU 55 and a GPU 53 cooperating therewith for generating video data based upon the plurality of video inputs and with added graphic content, at Block 63. More particularly, the added graphic content may be provided based upon a user input device(s) 59 cooperating with the multiviewer video processor 58 for permitting user selection of the added graphic content, such as a mouse, keyboard, etc., at Block 62. As such, a display 67 coupled to the multiviewer video processor 58 may advantageously display multiple video windows based upon the video data, at Block 64, thus concluding the illustrated method (Block 65).

The added graphic content is advantageously included along with the video windows, which are for respective video input feeds/streams, whereas such added graphic content could not be similarly provided by the above-described prior art systems. That is, the system 50 advantageously provides the added graphic content in a digital, GPU-based format in real-time, without having to perform offline modifications to the video inputs or display templates, or the necessity for separate graphics feeds, and separate from the plurality of video inputs and signal feeds.

Figure 5:
FIGS. 5-7 are multiviewer system multiple video data window displays illustrating various features provided by the system of FIG. 3.
Figure 6:
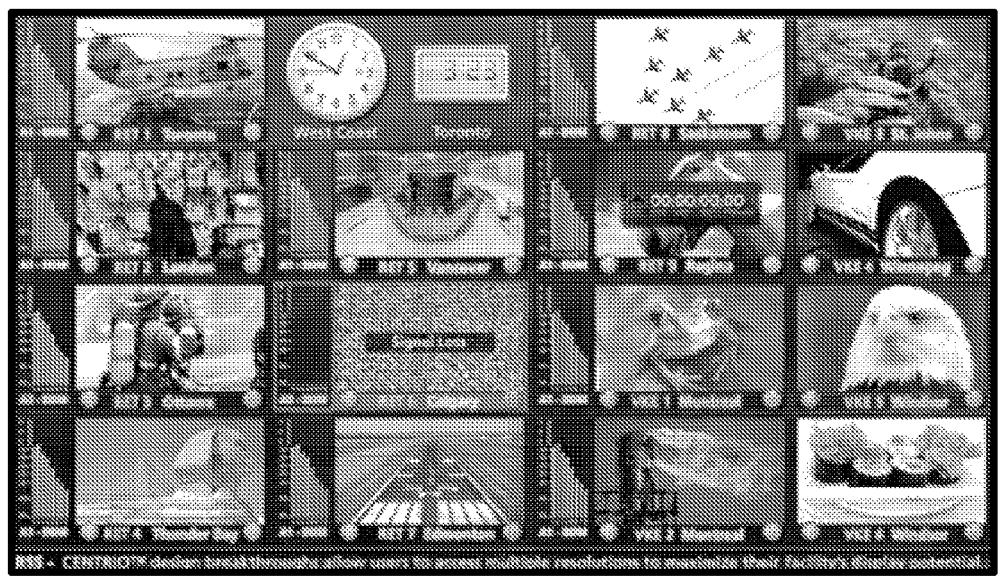

Thus, the implementation of such a GPU-based system may advantageously allow for more display features and/or flexibility. For example, the added graphic content may include one or more of the following: borders on the PIPs; audio meters; text labels (both static and dynamic); video waveform displays; clocks and timers; background graphics; tally indicators; onscreen controls (e.g., mouse, onscreen menus); Rich Site Summary (RSS) feeds; weather data; alarm information; video metadata information; Dolby-E metadata information; etc. Examples of such added content features are shown in the multiviewer display screen prints of FIGS. 5-7.

The introduction of the GPU 53 into the multiviewer video processor 58 architecture also allows for innovative uses of this technology such as video black and freeze detection using shaders, color space conversion, and/or video waveform displays that would otherwise require dedicated and expensive hardware, for example. Those of skill in the art will appreciate other added graphic content features that may also be included in different embodiments.

As noted above, the CPU/GPU-based system (e.g., a PC-based system) may therefore advantageously be used to display multiple simultaneous video streams while leveraging the graphics capabilities of API such as those of DirectX, for example. This allows enhanced flexibility in the type and visual richness of the system 50 output presented since this architecture may leverage the pixel processing power of the GPU. The system 50 may allocate a GPU texture buffer for each video stream to be displayed, and the video I/O module may DMA transfer the video stream data, after pre-scaling, directly to the allocated texture buffer, for example, as described above with respect to FIGS. 1 and 2. The various components and functions described above with respect to these figures may also be included in the system and method of FIGS. 3 and 4 (and vice-versa), as will be appreciated by those skilled in the art. The GPU 58 then renders the video streams to the graphics display 57 as separate display windows along with the added graphic content, as shown in the illustrated examples.

Figure 8:
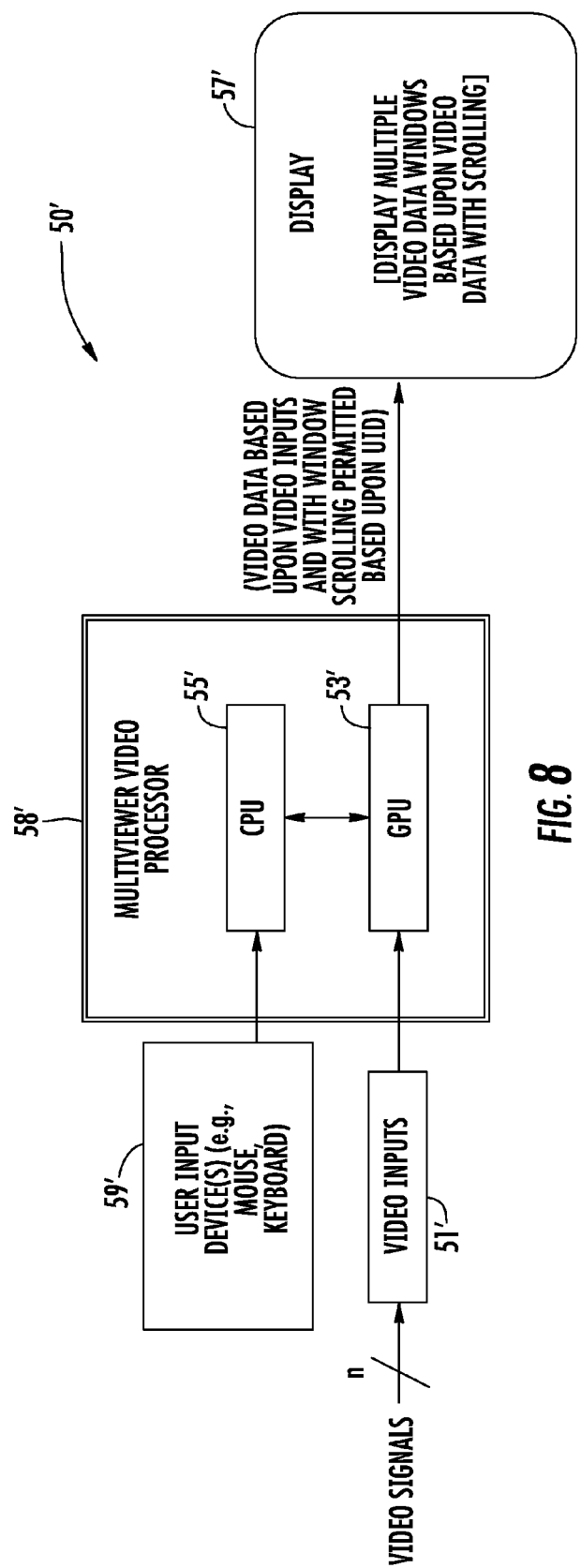
FIG. 8 is a schematic block diagram of yet another video multiviewer system providing video data based upon video inputs and with window scrolling permitted based upon a user input device.
Figure 9:
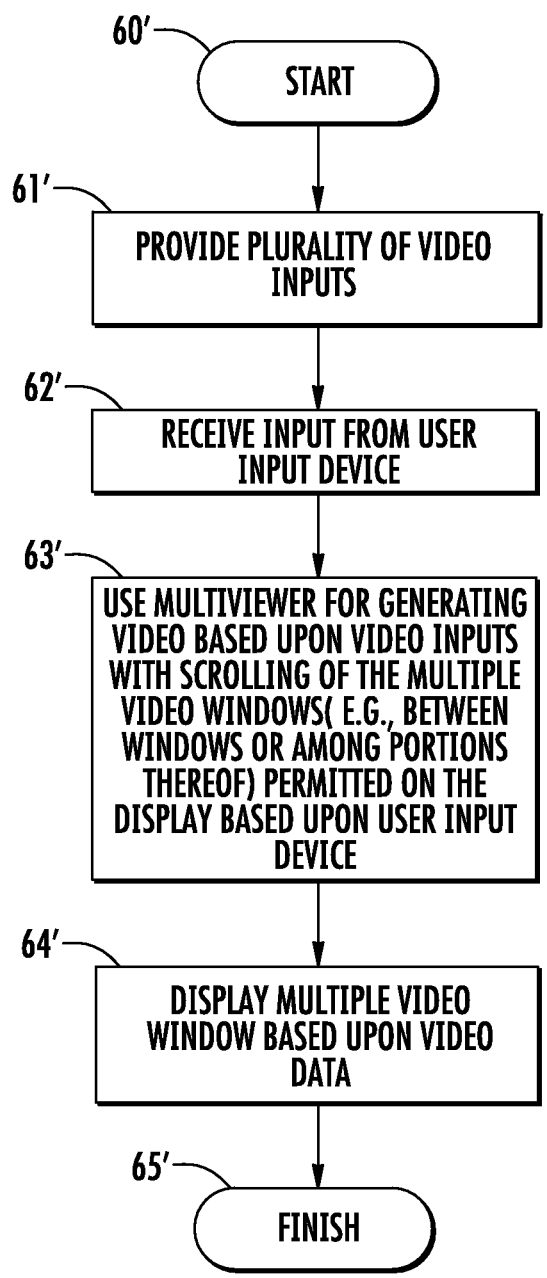
FIG. 9 is a flow diagram illustrating method aspects corresponding to the system of FIG. 8.

A related video multiviewer system 50' and associated method are now described with reference to FIGS. 8 and 9. In the present example, the multiviewer video processor 58' advantageously permits scrolling of the multiple video windows on the display 57' based upon the user input device(s) 59', at Block 63'. For example, the multiviewer video processor 58' may permit scrolling among the multiple video windows displayed on the display 57' at a given instant, and at least one other video window not displayed on the display at the given instant. That is, at the given instant there may be more video feeds available than will fit on the display depending upon the window size configuration, screen size, etc. Thus, a user may be able to quickly use a scroll bar, etc. to scroll the screen to see other video windows (or portions thereof) not visible on the screen at the given instant.

In accordance with another related aspect, a user may also be able to scroll through or between the various video feeds that are being displayed on the display 57'. For example, in certain applications the multiviewer system 50' operates in concert with a router (i.e., a video switching device) (not shown) that is either integral with the multiviewer or an external device. The video input module of the multiviewer typically supports a given number of physical inputs on which it can receive a video stream from the router. The router, however, has conceivably many hundreds of physical inputs—more than the number that can be displayed by the multiviewer system 50'.

In order to display more inputs than would otherwise be physically possible (i.e., due to the smaller number of available multiviewer inputs vs. router inputs), the multiviewer video processor 58' may advantageously scroll its physical inputs on the display device 57', that is, introducing, new inputs onto the screen while withdrawing previously viewed inputs from the screen. Simultaneously, the multiviewer video processor 58' controls the router to re-path new inputs to the multiviewer system 50' to match the visual presentation.

For example, if a user wanted to scroll through router inputs 1 through 500, only 32 of them at a time can be routed to the video on a multiviewer with 32 inputs. To scroll through all 500 sources, the user could create or set up a scroll such that only a few of the sources are on screen at a time (e.g., 10). Then the multiviewer video processor 58' would route the first router inputs 1 through 10 to 10 physical video inputs on the multiviewer (e.g., inputs #1-10). As input #1 scrolls off the screen, input #11 is scrolling on the screen. The physical input on the multiviewer that was ingesting stream #1 from the router is now re-defined for router stream #11. That is, the multiviewer video processor 58' cycles through an old (i.e., previously displayed) input to make way for a new input from the router. While there are still only 10 physical inputs being used, now streams 2 through 11 are the displayed streams rather than the initial streams 1 through 10. Each time a window or PIP goes off the screen, a corresponding new window/PIP appears on the screen. So, in accordance with this embodiment, the order of displayed input sets would be [1 . . . 10], then [2 . . . 11], then [3 . . . 12], etc. A graphic representation of the foregoing would be as follows:

```
IO connector #   01 02 03 04 05 06 07 08 09 10 (on multiviewer)
Router Input #   01 02 03 04 05 06 07 08 09 10
                 ⇓
(input 1 scrolls off, input 11 scrolls on)
Perform router change: IO #01 = input #11
                 ⇓
IO connector #   01 02 03 04 05 06 07 08 09 10
Router Input #   11 02 03 04 05 06 07 08 09 10
                 ^^ changed
                 ⇓
(input 2 scrolls off, input 12 scrolls on)
Perform router change: IO #02 = input #12
                 ⇓
IO connector #   01 02 03 04 05 06 07 08 09 10
Router Input #   11 12 03 04 05 06 07 08 09 10
                    ^^ changed
                 ⇓
(input 3 scrolls off, input 13 scrolls on)
Perform router change: IO #03 = input #13
                 ⇓
IO connector #   01 02 03 04 05 06 07 08 09 10
Router Input #   11 12 13 04 05 06 07 08 09 10
                       ^^ changed
``` etc. Of course, more than one window can be scrolled at a time, and other numbers of inputs and/or scrolling configurations may also be used, as will be appreciated by those skilled in the art.

In accordance with another advantageous configuration, the multiviewer video processor 58' may also permit scrolling among portions of the multiple video windows displayed on the display 57' at a given instant and at least one other portion not displayed on the display at the given instant. More particularly, within a given video window there may be a portion of the video feed that is not displayed due to the window size, cropping, etc. Thus, similar scroll bars, etc., may also be used to scroll the given video feed up/down, left/right, for example, to see the portion of the video feed not visible in the window at the given instant, as will also be appreciated by those skilled in the art. Here again, the direct memory transfer features and added content features discussed above with respect to the systems 30 and 50 may also be incorporated in the present embodiment, and vice-versa.

The multiviewer embodiments described may advantageously be used in various applications. By way of example, such applications may include broadcast, security, and medical settings, although other applications are also possible.

This application is related to co-pending patent applications entitled VIDEO MULTIVIEWER SYSTEM FOR GENERATING VIDEO DATA BASED UPON MULTIPLE VIDEO INPUTS WITH ADDED GRAPHIC CONTENT AND RELATED METHODS, Ser. No. 12/100,525 and VIDEO MULTIVIEWER SYSTEM PERMITTING SCROLLING OF MULTIPLE VIDEO WINDOWS AND RELATED METHODS, Ser. No. 12/100,529, the disclosures of which are hereby incorporated herein in their entireties by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A video multiviewer system comprising:
   a router configured to receive video data comprising a plurality of video streams at a plurality of video inputs;
   a video input/output (I/O) controller configured to receive a subset of video streams of the plurality of video streams at respective video inputs, wherein the subset of video streams comprises at least two video streams;
   a system memory;
   a graphics processing unit (GPU) comprising a GPU memory;
   a central processing unit (CPU) configured to operate the video I/O controller to transfer the subset of video streams to the GPU memory via direct memory access (DMA) without being stored in the system memory; and
   a display configured to receive and display the subset of video streams that are stored in the GPU memory on the display simultaneously in respective display windows, each of the respective display windows providing a video corresponding to one of the subset of video streams,
   wherein the video I/O controller is further configured to assign and lock addresses to be used for the subset of video streams in the GPU memory while also allowing the subset of video streams to remain accessible via the locked addresses during video transfer,
   wherein the CPU is further configured to control the router to select and provide the subset of video streams of the plurality of video streams to the video I/O controller for displaying in the respective display windows on the display in response to a user input at a user device
   wherein the display is further configured to scroll between a viewable portion of the video in one of the respective display windows on the display and a non-viewable portion of the video in the one of the respective display windows on the display in response to the user input at the user device.

2. The video multiviewer system of claim 1 wherein the GPU memory comprises at least one texture buffer in which the CPU locks the assigned addresses.

3. The video multiviewer system of claim 2 wherein the video I/O controller is configured to receive a plurality of video input streams; and wherein said at least one texture buffer comprises a respective texture buffer for each video input stream.

4. The video multiviewer system of claim 1 wherein the CPU is configured to operate the video I/O controller and the GPU to transfer video data in real time.

5. The video multiviewer system of claim 1 wherein the video data comprises video frame data corresponding to respective video frames of the plurality of video streams.

6. The video multiviewer system of claim 1 wherein the CPU is configured to use at least one Microsoft DirectX application programming interface (API) for operating the GPU.

7. The video multiviewer system of claim 1 further comprising at least one data communications bus coupled to the video I/O controller, the system memory, the GPU, and the CPU.

8. The video multiviewer system of claim 1 wherein the video I/O controller has fewer video inputs than video inputs than the router.

9. The video multiviewer system of claim 1,
   wherein the CPU is further configured to add graphic content to a given video window of the display.

10. The video multiviewer system of claim 9 wherein the added graphic content comprises video metadata characterizing a respective video stream displayed within the given video window.

11. The multiviewer system of claim 1 wherein the CPU is further configured to control the router in response to the user input at the user input device to:
    select a given video stream of the plurality of video streams to replace one of the at least two video streams currently being displayed on the display; and
    provide the given video stream to the video I/O controller for displaying on the display.

12. A method for displaying on a display multiple video windows comprising:
    receiving a plurality of video streams at a plurality of video inputs of a router;
    receiving a subset of video streams of the plurality of video streams at respective video inputs of a video input/output (I/O) controller, wherein the subset of video streams comprises at least two video streams;
    operating a central processing unit (CPU) to operate the video I/O controller to transfer the subset of video streams to a graphics processing unit (GPU) memory via direct memory access (the DMA) without being stored in a system memory by assigning and locking addresses to be used for the subset of video streams in the GPU memory while also allowing the subset of video streams to remain available via the locked addresses during video transfer;
    configuring the display to receive and display the subset of video streams in respective video windows on the display simultaneously, wherein each of the respective display windows provides a video corresponding to one of the subset of video streams;
    controlling, via the CPU, the router to select and provide the subset of video streams of the plurality of video streams to the video I/O controller for displaying in the respective display windows on the display in response to a user input at a user device; and scrolling between a viewable portion of the video in one of the respective display windows on the display and a non-viewable portion of the video in the one of the respective display windows on the display in response to the user input at the user device.

13. The method of claim 12 wherein the GPU memory comprises at least one texture buffer in which the CPU locks the assigned addresses.

14. The method of claim 12 wherein operating comprises operating the CPU to operate the GPU to transfer the subset of video streams in real time.

* * * * *